H. L. BROWN.
SEED-DRILL.
No. 191,565. Patented June 5, 1877.
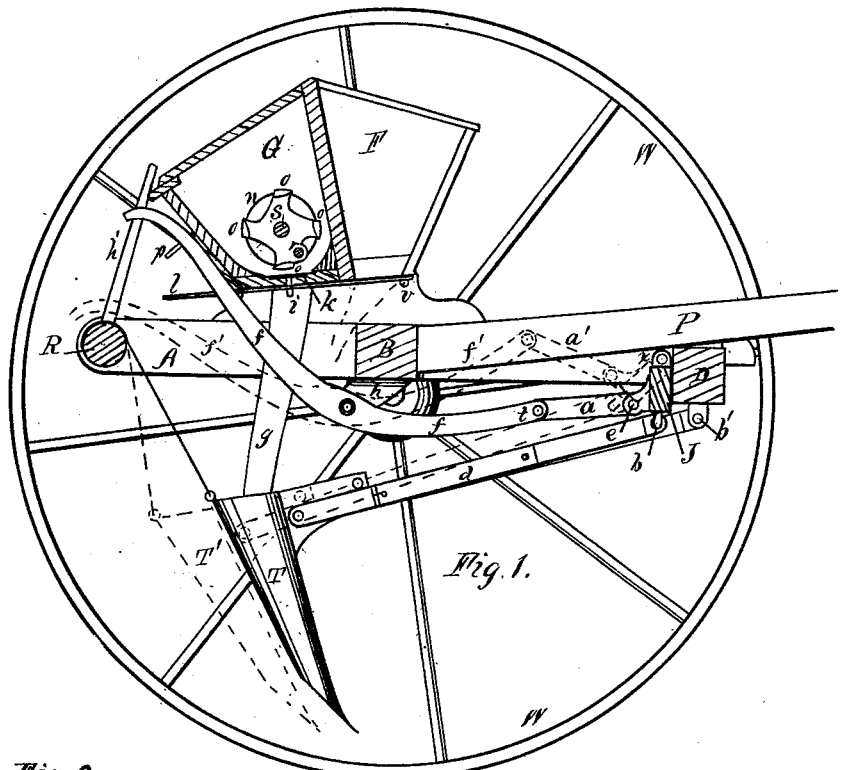
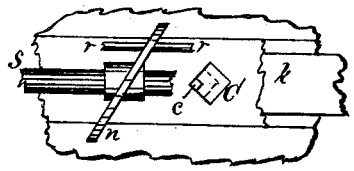
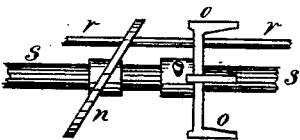
Witnesses,
S. G. Mason
G. B. Selden.
Inventor.
H. L. Brown
By Wm. S. Loughborough
Atty.

UNITED STATES PATENT OFFICE.

HIRAM L. BROWN, OF SHORTSVILLE, NEW YORK.

IMPROVEMENT IN SEED-DRILLS.

Specification forming part of Letters Patent No. 191,565, dated June 5, 1877; application filed May 17, 1876.

*To all whom it may concern:*

Be it known that I, HIRAM L. BROWN, of Shortsville, in the county of Ontario and State of New York, have invented certain new and useful Improvements in Seed-Drills; and I do hereby declare that the following is a full, clear, and exact description thereof, reference being had to the accompanying drawing, making part of this specification, in which—

Figure 1 is a vertical sectional view of a seed-drill having my improvements attached. Fig. 2 is a plan of a section of the bottom of the seed-box, with one of the square openings C and one conveyer, $n$, upon the shaft $s$. Fig. 3 is a detached view of a section of the shaft $s$ with a conveyer, $n$, one head, to which the agitators $o$ are attached, and a section of the stirrer-rod $r$. Figs. 2 and 3 are somewhat enlarged.

This invention consists in a peculiar construction of the feeding or agitating apparatus.

My improvements are applicable either to the ordinary grain-drill or to the combined grain-drill and fertilizer-sower. The combined fertilizer and grain-box F G is represented in the drawing. To the shaft $s$ I attach a series of heads carrying several stirrer or agitator arms, $o$. One of these heads is arranged upon the shaft so as to work directly over each of the seed-openings C. Upon the same shaft are arranged, intermediately between the stirrers, conveyer-flights $n$. They consist of oblong circular blades arranged obliquely upon their hubs; therefore, as will be seen, when the shaft is making one-half its revolution, the flights convey in one direction, and during the other half they convey in the opposite direction.

I provide an auxiliary stirrer, consisting of one or more rods, $r$, running nearly or quite the length of the grain-box G, and supported by resting in openings formed either in the flights $n$ or in the stirrer-heads, or both. The object of the stirrers is to insure the constant and uniform feed of any and all kinds of grain. The shaft $s$ may be driven by a belt or gear from one of the ground-wheels W of the machine in the usual way.

The feed-openings C in the bottom of the grain-box G, and those in the slide or gage-plate $k$, I make square and arrange them diagonally, as shown in Fig. 2. Thus, it will be seen that when the gage-plate $k$ is moved so as to reduce the size of the openings, as indicated at $c$, they will still be square, whatever their size may be. This I have found to be a much more satisfactory method of regulating the feed than by a round or by a square opening, when the latter is arranged with its sides parallel to the movement of the slide $k$. This slide is adjusted in the usual manner by the pin $i$ passing through the hand-lever $l$, which is pivoted at $v$ to the bottom of the grain-box.

It has been found very desirable to have a portion of the drill-teeth T made conveniently adjustable longitudinally with relation to the travel of the machine. This I accomplish in the following manner: The draft-strap $d$ of each alternate tooth I attach to the bar J, Fig. 1, which is pivoted at each end to the side bars A, as shown at $x$. One end of a link, $a$, is hinged near the rear lower corner of said bar to a lug, $e$, the other end being hinged to the front end of a lever, $f$, which is pivoted centrally to a lug, $h$, attached to the under side of the cross-beam B. When the parts occupy the position shown in full lines the teeth T are all in line, where they are secured by the joint at $t$ dropping below the line from the axial joint of the lever to the lug or joint $e$.

An additional locking security may be provided by attaching a spring-hook, $p$, to the rear of the grain-box, to hold the outer end of the lever.

$g$ represents the conductor-tube from the openings in the bottom of the grain-box to the drill-teeth. These tubes may be either jointed or made of flexible material, as ordinarily practiced.

What I claim as my invention is—

1. The revolving distributers or agitators $o$, constructed as shown and described, and arranged upon the shaft $s$, in combination with the openings C, for the purposes set forth.

2. In combination with the distributers or agitators $o$ and distributing-cavities C, the revolving auxiliary agitator $r$, all constructed and arranged to operate conjointly, in the manner and for the purposes set forth.

HIRAM L. BROWN.

Witnesses:
WM. S. LOUGHBOROUGH,
N. A. PIERCE.